G. QUACKENBUSH.
BUCKLE FOR HARNESS.
No. 194,049. Patented Aug. 14, 1877.
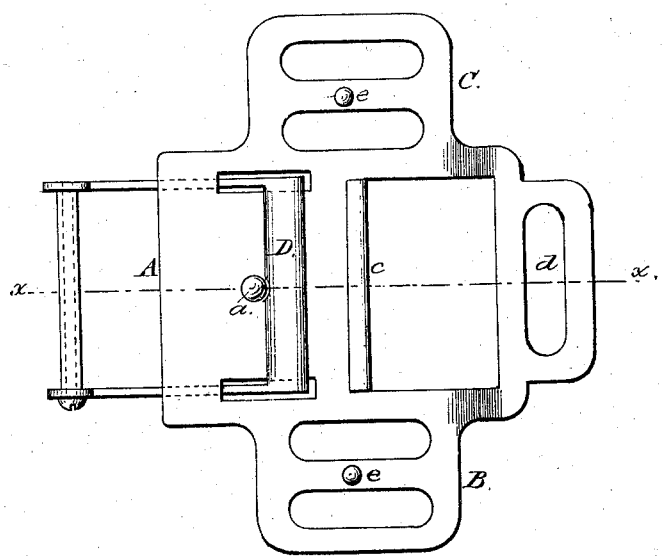
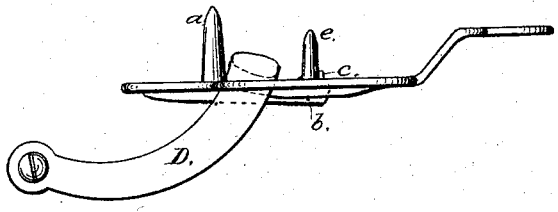
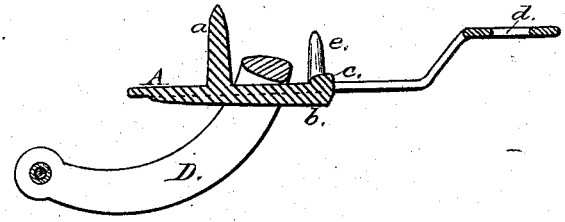
Witnesses:
Joshua H. Tharp
John W. Lindsay
Inventor:
Geo. Quackenbush

UNITED STATES PATENT OFFICE.

GEORGE QUACKENBUSH, OF BATH, NEW YORK.

IMPROVEMENT IN BUCKLES FOR HARNESS.

Specification forming part of Letters Patent No. 194,049, dated August 14, 1877; application filed June 23, 1877.

*To all whom it may concern:*

Be it known that I, GEORGE QUACKENBUSH, of Bath, in the county of Steuben and State of New York, have invented a new and useful Improvement in Buckles, which improvement is fully set forth in the following specification, reference being had to the accompanying drawings.

The object of my invention is to construct a buckle with a bail, to which one end of the hame-tug is fastened, and the main plate having a place for the trace, and at the sides of the main plate buckles for the lower end of the back-band and upper end of the belly-band, with stationary tongues for each, and the rear part extending backward and bent outward with a slot for the side straps of the breeching, so that with my invention all the above-mentioned parts of a harness are held firmly together, and may be adjusted at will, as shown in the accompanying drawings, in which—

Figure 1 is a side view when on the left side of a horse, and Fig. 2 a vertical view when on the right side; Fig. 3, a section on line $x$ $x$ of Fig. 1.

A is the main plate, made of metal. It may be made of any required size, and its shape is represented in Fig. 1. The central part is made wider than the width of the trace that is to be used with it. It has a stationary tongue, $a$, made on its upper surface, to pass through the holes in the trace. On the opposite side, and contiguous with the tongue, is a rib, $b$, extending nearly across the plate longitudinally, and made with the plate to strengthen it. At the rear end, and on the outside of the rectangular part, is another rib, $c$, made on the plate to strengthen it and aid in clasping the trace in connection with the bail D. This plate has slots through it at the sides opposite the tongue for the side pieces of the bail to pass through. They must be made to correspond with the bail to hold it in proper position. A series of small holes may be made through the plate, to be used to fasten a covering of leather or other material to either or both sides of the plate. At the rear part of the plate an extension is made, as shown in Fig. 1. It is bent outward, so that the trace may pass through under it, and the rear end has a slot, $d$, in it for the side straps of the breeching to pass through. B and C are additional buckles, connected to or made with the main plate A, as shown in Fig. 1. The middle bar of each is made lower than the rim, to allow the straps to be put in with more ease, and, when in, are less bent. In the middle of each cross-bar is a stationary tongue, $e$, by which the straps are held and adjusted. These buckles are to hold the lower ends of the back-band and upper end of the belly-band. D is a bail, made to extend crosswise of the main plate, as shown in Fig. 1, and with side pieces extending through the plate, and shaped as shown in Fig. 2. The forward ends have a bolt through them, by which it is attached to the rear end of the hame-tug. The part that extends across the plate must be situated in the rear of the tongue $a$, and the trace, when put in, must be put between it and the plate, for the purpose of having the bail hold the trace firmly in place.

Having thus fully described my invention, what I claim as new, and desire to secure by Letters Patent, is—

In a trace-buckle, the combination of the main plate A, provided with ribs $b$ and $c$, and bail D, with auxiliary side buckles, all constructed and operating substantially as shown and described.

GEO. QUACKENBUSH.

Witnesses:
JOSHUA H. THORP,
JOHN W. LINDSAY.